United States Patent
Sapt et al.

(10) Patent No.: US 9,933,127 B2
(45) Date of Patent: Apr. 3, 2018

(54) VEHICLE LIGHT

(71) Applicants: Georgiy Pavlovich Sapt, Moscow (RU); Maxim Yurievich Davydov, Moscow (RU)

(72) Inventors: Georgiy Pavlovich Sapt, Moscow (RU); Maxim Yurievich Davydov, Moscow (RU)

(*) Notice: Subject to any disclaimer, the term of this patent is extended or adjusted under 35 U.S.C. 154(b) by 192 days.

(21) Appl. No.: 14/909,101

(22) PCT Filed: Aug. 8, 2013

(86) PCT No.: PCT/RU2013/000688
§ 371 (c)(1),
(2) Date: Jan. 29, 2016

(87) PCT Pub. No.: WO2015/020555
PCT Pub. Date: Feb. 12, 2015

(65) Prior Publication Data
US 2016/0178154 A1 Jun. 23, 2016

(51) Int. Cl.
*F21V 5/00* (2018.01)
*F21S 8/10* (2006.01)
(Continued)

(52) U.S. Cl.
CPC ......... *F21S 48/1225* (2013.01); *F21S 41/143* (2018.01); *F21S 41/285* (2018.01);
(Continued)

(58) Field of Classification Search
CPC ............... F21S 48/1225; F21S 48/1715; F21S 48/1275; F21S 48/1291; F21S 48/125;
(Continued)

(56) References Cited

U.S. PATENT DOCUMENTS 2,760,051 A * 8/1956 Schmidt .................. B60Q 1/14
362/520
3,253,525 A * 5/1966 Merkel .................... G02B 5/04
352/140

(Continued)

FOREIGN PATENT DOCUMENTS

DE 1162911 A * 9/1969 ............ G02B 21/12
DE 10344172 A1 * 4/2005 .......... F21S 48/1721

*Primary Examiner* — Bryon T Gyllstrom
*Assistant Examiner* — James Endo
(74) *Attorney, Agent, or Firm* — Inventa Capital PLC

(57) ABSTRACT

This invention relates to illumination systems, namely, to automotive headlamps and can be used as the principal head lighting of light and cargo vehicles. The automotive headlamp includes at least one LED and a system of lenses. The system of lenses includes both composite diverging and regulating lenses. The composite diverging lens is made up of two plano-concave lenses. The composite regulating lens is made up of the converging plano-convex lens and the refracting right-angled wedge placed in a series through the luminous flux. The composite regulating lens is placed between the LED and the composite diverging lens, which is suitable for controllable obscuration of the light flux. The invention enhances the reliability of the high/low-beam switch system.

3 Claims, 5 Drawing Sheets

(51) Int. Cl.
*G02B 19/00* (2006.01)
*B60Q 1/124* (2006.01)
*F21V 5/04* (2006.01)
*B60Q 1/12* (2006.01)

(52) U.S. Cl.
CPC .............. *F21S 41/63* (2018.01); *F21S 41/663* (2018.01); *G02B 19/0019* (2013.01); *G02B 19/0061* (2013.01); *B60Q 1/12* (2013.01); *B60Q 1/124* (2013.01); *F21S 41/25* (2018.01); *F21S 41/265* (2018.01); *F21S 41/635* (2018.01); *F21V 5/008* (2013.01); *F21V 5/048* (2013.01)

(58) Field of Classification Search
CPC ............. F21S 48/1721; F21S 48/1283; G02B 19/0014; G02B 19/0009; G02B 19/0061; F21V 5/008; F21V 5/048; B60Q 1/12; B60Q 1/122; B60Q 1/124
USPC ................................ 362/520, 521, 522, 331
See application file for complete search history.

(56) References Cited

U.S. PATENT DOCUMENTS

| | | | | |
|---|---|---|---|---|
| 3,507,565 A * | 4/1970 | Alvarez | ................... | A61B 3/04 351/159.42 |
| 4,118,109 A * | 10/1978 | Crawford | ........... | G02B 26/0883 359/196.1 |
| 4,345,303 A * | 8/1982 | Gerard | ................... | B60Q 1/06 362/268 |
| 4,771,372 A * | 9/1988 | Litetar | ................ | F21S 48/1233 362/189 |
| 5,795,057 A * | 8/1998 | Weigert | .................... | F21S 8/00 362/268 |
| 5,997,163 A * | 12/1999 | Brown | ................. | B60Q 1/0483 362/259 |
| 6,337,873 B1 * | 1/2002 | Goering | ................. | G02B 27/09 359/618 |
| 6,344,937 B1 * | 2/2002 | Sparrold | ............ | G02B 27/0025 359/211.2 |
| 7,217,002 B2 * | 5/2007 | Jungel-Schmid | ......... | F21S 8/02 362/147 |
| 8,079,734 B2 * | 12/2011 | Hou | ......................... | F21V 5/02 362/281 |
| 2004/0090519 A1 * | 5/2004 | Mikhailov | ............. | G02B 27/09 347/224 |
| 2008/0129964 A1 * | 6/2008 | Alasaarela | ......... | G02B 27/0911 353/81 |
| 2008/0151567 A1 * | 6/2008 | Albou | .................. | F21S 48/1159 362/507 |
| 2009/0122547 A1 * | 5/2009 | Hou | ........................ | F21V 14/06 362/277 |
| 2009/0122549 A1 * | 5/2009 | Hou | ........................ | F21V 5/04 362/282 |
| 2009/0262546 A1 * | 10/2009 | Stefanov | .............. | F21S 48/1154 362/507 |
| 2010/0165628 A1 * | 7/2010 | Davydov | ............. | F21S 48/1154 362/268 |
| 2010/0321940 A1 * | 12/2010 | Zhong | ..................... | F21V 14/04 362/268 |
| 2011/0305007 A1 * | 12/2011 | Chang | .................... | F21V 5/008 362/105 |

\* cited by examiner

VEHICLE LIGHT

FIELD OF INVENTION

This invention relates to illumination systems, namely, to automotive headlamps and can be used as the principal head lighting of light and cargo vehicles.

The automotive headlamp is known from previous equipment to comprise at least one LED and a lens system including a composite diverging lens made up of two plano-concave lenses (see Patent RU 82178, Class F21S 2/00, published on Apr. 20, 2009). Among the drawbacks of this common device are a high probability of complete failure and poor focusing accuracy of the high/low-beam switch system based on the linear displacement of the plano-concave lenses. The object of this invention is to eliminate these drawbacks.

The technical result is to increase the reliability of operation of the high/low-beam switch system. The task at hand is solved and the technical result is achieved through the fact that the automotive headlamp comprises of at least one LED and lens system including a composite diverging lens made up of two plano-concave lenses and located between the LED and the composite diverging lens, which allows for controllable obscuration of the light flux to control the composite lens, which is made up of the converging plano-convex lens and the refracting right-angled wedge placed in a series through the luminous flux. The composite diverging and regulating lenses can have a revolute system between them featuring two cylindrical refracting wedges, with their flat bottoms located next to each other, where at least one of them is rotatable with respect to the optical axis of the system synchronized with the steering input. The LED is preferably equipped with a collimator lens. The composite diverging lens has the first lens through the luminous flux facing the LED with its concave side, while the second one faces it with its flat side.

DETAILED DESCRIPTION OF THE PREFERRED EMBODIMENT

Figure 1:
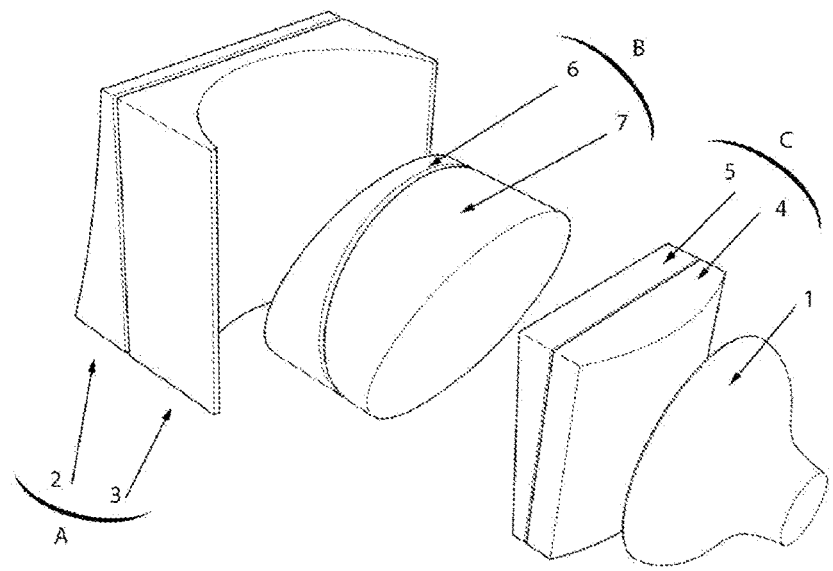
FIG. 1 shows the proposed automotive headlamp.
Figure 2:
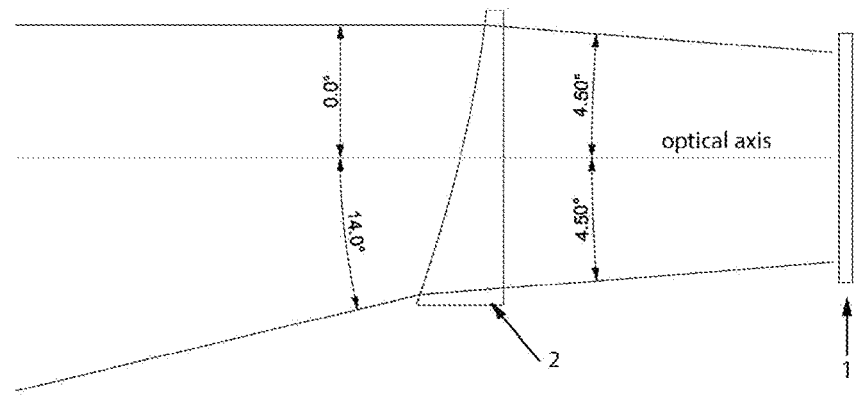
FIG. 2 shows the path of optical beams at the output of the headlamp.
Figure 3:
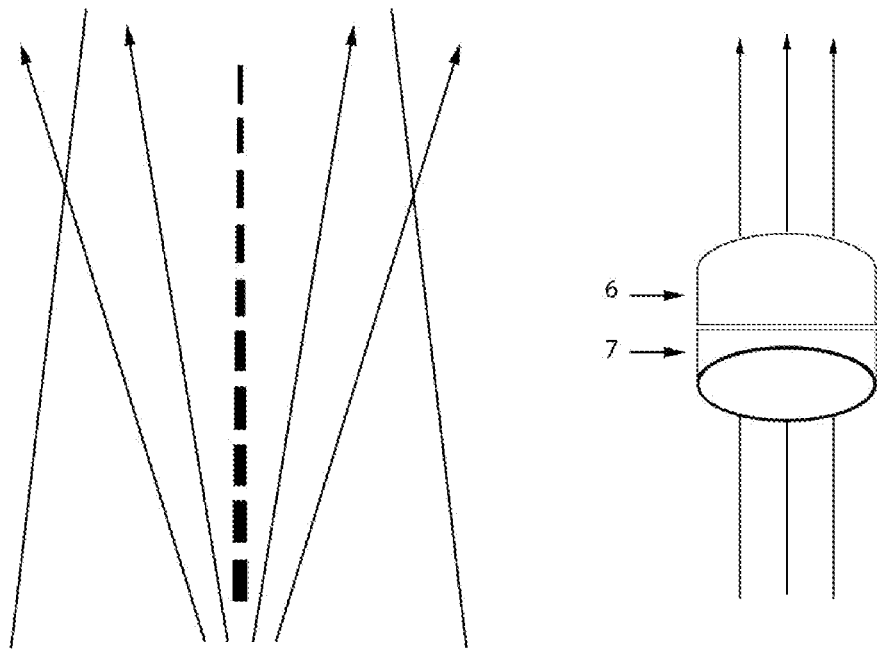
FIG. 3 shows the steering system in a straight position and the corresponding light spot on the roadway.
Figure 4:
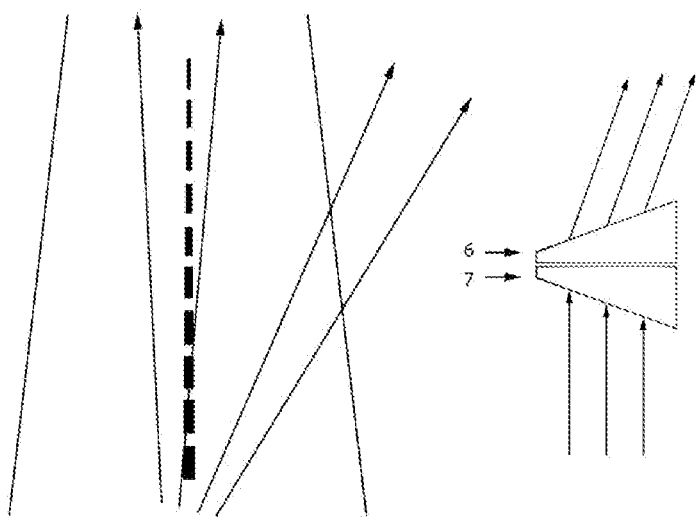
FIG. 4 shows the same as FIG. 3 with the steering input.
Figure 5:
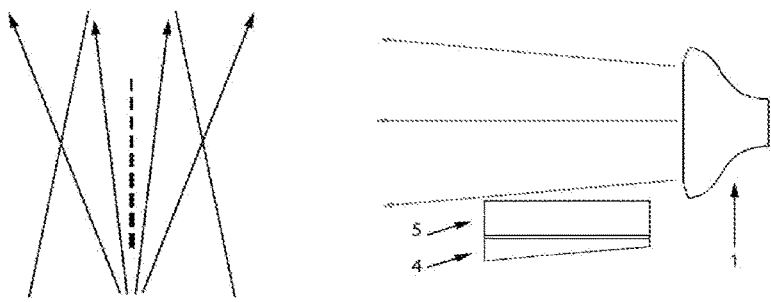
FIG. 5 shows the composite regulating lens in a position not obscuring the light beam.
Figure 6:
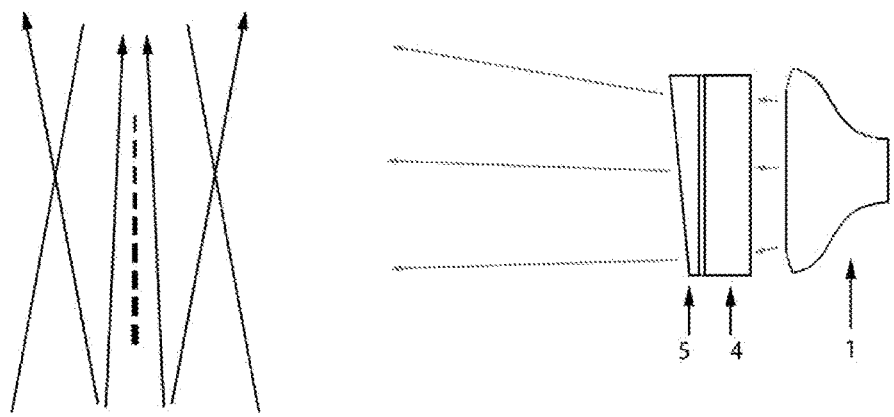
FIG. 6 shows the same as FIG. 5 in a position obscuring the light beam.
Figure 7:
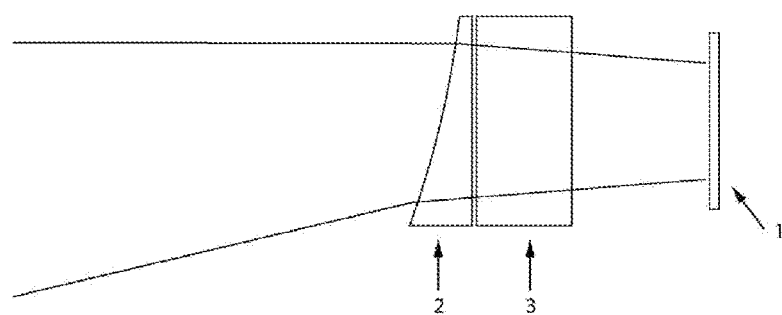
FIG. 7 shows the path of optical beams with no composite regulating lens, profile view.
Figure 8:
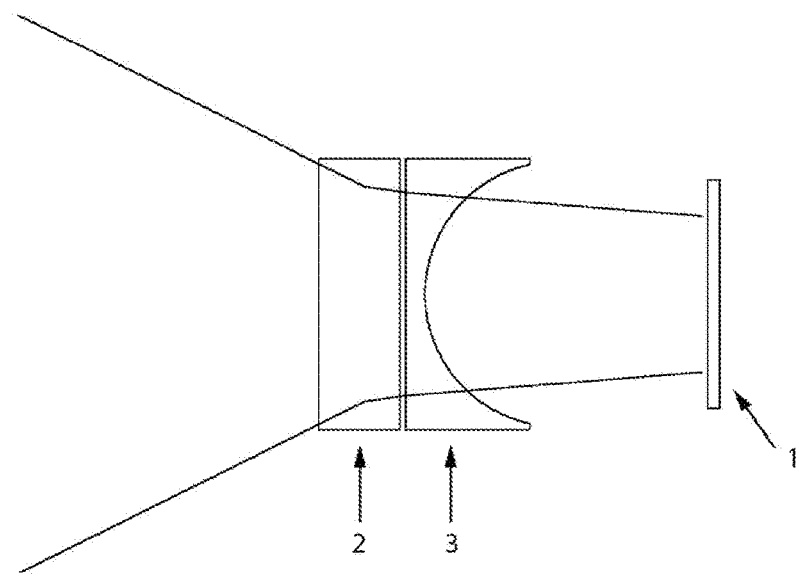
FIG. 8 shows the path of optical beams with no composite regulating lens, top view.
Figure 9:
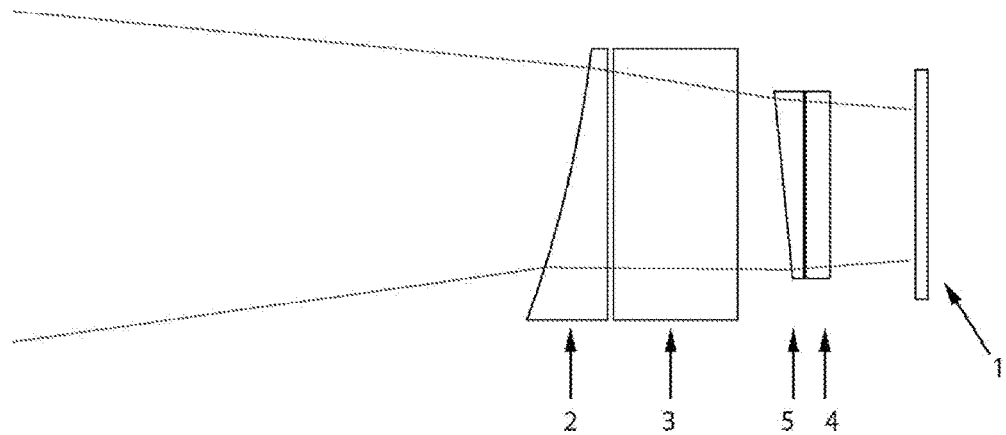
FIG. 9 shows the path of optical beams with the composite regulating lens, profile view.
Figure 10:
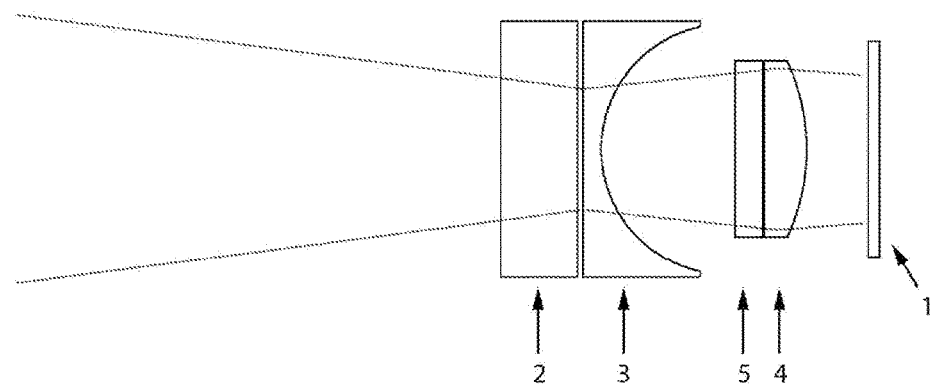
FIG. 10 shows the path of optical beams with the composite regulating lens, top view.

The automotive headlamp is composed of one or more LEDs, 1 is equipped with a collimator lens, as well as an optical system consisting of blocks A, B and C. Block A is the composite diverging lens made up of the two plano-concave lenses 2 and 3. The first lens through the luminous flux 3 has its concave side facing the LED, whereas the second lens 2 faces the LED with its flat side. LED 1 and the composite diverging lens of Block A have the composite regulating lens of Block C in between, suitable for controllable obscuration of the light flux. The Block C lens is made up of converging plano-convex lens 4 and refracting right-angled wedge 5 placed in a series through the luminous flux.

The composite diverging lens of Block A and the composite regulating lens of Block C have the revolute system of Block B made up of two cylindrical refracting wedges 6 and 7. Wedges 6-7 are located on the same optical axis with their flat bottoms facing each other. At least one of wedges 6-7 is designed to be rotatable with respect to the optical axis of the system synchronized with the steering input.

The proposed headlamp provides the ability to work in the following operating modes: Low-beam mode, High-beam mode due to reconfiguration of the light beam using Block C, Light beam turn mode in which the beam follows the steering-wheel angle by using Block B.

The role of the composite diverging lens of Block A is the expansion of the light beam along axes. Diverging plano-concave lens 3 extends the light beam along the X-axis, whose radius of curvature is based on the requirements for the optical system. Diverging plano-concave lens 2 extends the light beam along the Y-axis, whose radius of curvature is selected in such a way that the upper part of the light flux passing through Block A is parallel to the optical axis, and with an increased tilt of the bottom part. Thus, the underlying concept of design of automotive headlamp optics is fulfilled: In low-beam mode the upper part of the light beam has zero tilt angle relative to the horizon and therefore does not blind drivers in oncoming traffic.

Block B is designed to provide the rotation of the light beam during steering input. In the neutral position, wedges 6-7 neutralize the refraction angles of each other: By first passing through wedge 6, the light beam is refracted at an angle of N degrees along the Y-axis, but when passing through wedge 7, it is repeatedly refracted by −N degrees, thereby leaving the resulting angle unchanged. When turning relative to each other, the wedges' total angle of refraction changes, and the light beam diverges from a straight line. Thus, the revolute system allows for a change in the direction of the light beam of the headlamp relative to the road, i.e. illuminate the road space during and after a turn.

Adjustment of the relative angle of rotation of wedges 6-7 may be: Three-positional, i.e. it can have three positions— two outer and one neutral position, implemented using one or more solenoids. Incremental, i.e. the rotation of the wedges can be broken down into specific increments related to certain angles. This can be implemented by using stepping motors. Smooth, i.e. the angle of rotation of the wedges is accurately tied to the angle of the steering wheel or other controls. It can be implemented by using an electric motor or microprocessor control unit.

Block C represents a high/low-beam switch system. In the retracted position, the composite regulating lens operates in low-beam mode, and in the working position (on the optical axis of the system) it intercepts the light beam by focusing it and increasing its range—high-beam mode. Lens movement control is carried out using a solenoid.

The proposed optical system is complete and can be used as the main headlight for vehicles, public transport, special vehicles, and railway rolling stock. A headlight system can have a single system or be made up of several similar systems (this may be due to the requirements for capacity of the LED light source used for the system). Lenses and other elements can be made from either K8 optical glass or acrylic glass. Due to the difference in the refraction indices of each material, a corresponding adjustment is required for the radii of curvature and tilt angles. As far as merits of the proposed headlamp are concerned, as compared to the currently existing LED systems used for automotive optics, the following can be pointed out: The system is free from reflectors and is designed completely using lenses, which allows for a great level of precision in producing a light beam.

When forming the low/high beam, 100% of the original light beam is used, as compared to the currently existing systems where a low-beam mode has a 50% cutoff of the light used, thus adversely affecting its efficiency. In addition, the selection of the high/low-beam lighting system in a separate Block C can significantly enhance its reliability and positioning accuracy. The light beam rotation system is implemented using two light elements (refracting wedges) relative to each other, as compared to the currently existing systems, which utilize rotation of the entire headlamp casing or its basic blocks, thus exerting a greater load on the power grid of the vehicle and complicating the design of the headlamp.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An automobile comprising a steering input and an automobile headlamp, the automobile headlamp comprising:
   at least one LED; and
   a lens system including
   a composite diverging lens made up of a first plano-concave lens and a second plano-concave lens; and
   a composite regulating lens for controllable obscuration of the light flux located between the at least one LED and the composite diverging lens, the composite regulating lens made up of a converging plano-convex lens and a refracting, right-angled wedge placed in a series through the light flux, and
   a revolute system between the composite diverging and regulating lenses, the revolute system made up of two cylindrical refracting wedges, the flat bottom side of each cylindrical refracting wedge facing each other, where at leant one of the cylindrical refracting wedges rotates with respect to the optical axis of the lens system synchronized with the steering input of the automobile.

2. The automotive headlamp as set forth in claim 1, including the at least one LED equipped with a collimator lens.

3. The automotive headlamp as set fort in claim 1, wherein the composite diverging lens has the first plano-concave lens through the light flux facing the at least one LED with its concave side, with the second plano-concave lens facing the at least one LED.

\* \* \* \* \*